(12) United States Patent
Sunamori et al.

(10) Patent No.: US 7,993,592 B2
(45) Date of Patent: Aug. 9, 2011

(54) PROCESS FOR PRODUCTION OF AMPHOTERIC ELECTROLYTE RESIN BY CONTINUOUS BULK POLYMERIZATION AND APPARATUS FOR THE PRODUCTION

(75) Inventors: Takashi Sunamori, Funabashi (JP); Akira Otsuki, Higashikurume (JP); Akihiko Itaya, Tokyo (JP)

(73) Assignee: Taisei Chemical Industries, Ltd., Tokyo (JP)

( * ) Notice: Subject to any disclaimer, the term of this patent is extended or adjusted under 35 U.S.C. 154(b) by 0 days.

(21) Appl. No.: 12/980,734

(22) Filed: Dec. 29, 2010

(65) Prior Publication Data
US 2011/0158856 A1 Jun. 30, 2011

Related U.S. Application Data

(62) Division of application No. 11/887,186, filed as application No. PCT/JP2005/005743 on Mar. 28, 2005, now Pat. No. 7,879,957.

(51) Int. Cl.
*C08F 2/00* (2006.01)
*B01J 10/00* (2006.01)

(52) U.S. Cl. ........... 422/129; 526/61; 526/65; 526/73

(58) Field of Classification Search ........... 422/129; 526/61, 65, 73
See application file for complete search history.

(56) References Cited

U.S. PATENT DOCUMENTS

| | | | |
|---|---|---|---|
| 3,565,866 A | 2/1971 | Guenther et al. | |
| 3,859,268 A | 1/1975 | Novack et al. | |
| 3,968,059 A | 7/1976 | Shimada et al. | |
| 3,974,126 A * | 8/1976 | Narita et al. | 528/174 |
| 4,529,787 A | 7/1985 | Schmidt et al. | |
| 4,546,160 A | 10/1985 | Brand et al. | |

FOREIGN PATENT DOCUMENTS

| | | |
|---|---|---|
| JP | 62-4048 B | 12/1980 |
| JP | 61-8856 B | 1/1982 |
| JP | 05-61284 B | 9/1983 |
| JP | 02-33041 B | 7/1990 |
| JP | 04-335001 A | 11/1992 |
| JP | 05-58005 B | 8/1993 |
| JP | 09-31108 A | 2/1997 |
| JP | 2003-505553 A | 2/2001 |
| JP | 2002-37804 A | 2/2002 |
| JP | 2005-105145 A | 4/2005 |
| KR | 2005/0015877 | 2/2005 |
| WO | WO 82/02387 | 7/1982 |
| WO | WO 01/06999 A1 | 2/2001 |

* cited by examiner

*Primary Examiner* — William K Cheung
(74) *Attorney, Agent, or Firm* — Paul E. White, Jr.; Manelli Denison & Selter PLLC

(57) ABSTRACT

A continuous polymerization apparatus is provided for producing an amphoteric electrolyte resin by continuous bulk polymerization at low cost, which apparatus includes a reaction vessel, the reaction vessel including at least four polymerization zones adjacent to each other in series, each polymerization zone being separated by a partition plate, the partition plates admitting a stirring shaft with stirrers, each of the polymerization zones having a thermosensor for sensing temperature within the polymerization zone, a heating device for heating the polymerization zone and a cooling device for cooling the polymerization zone.

19 Claims, 2 Drawing Sheets

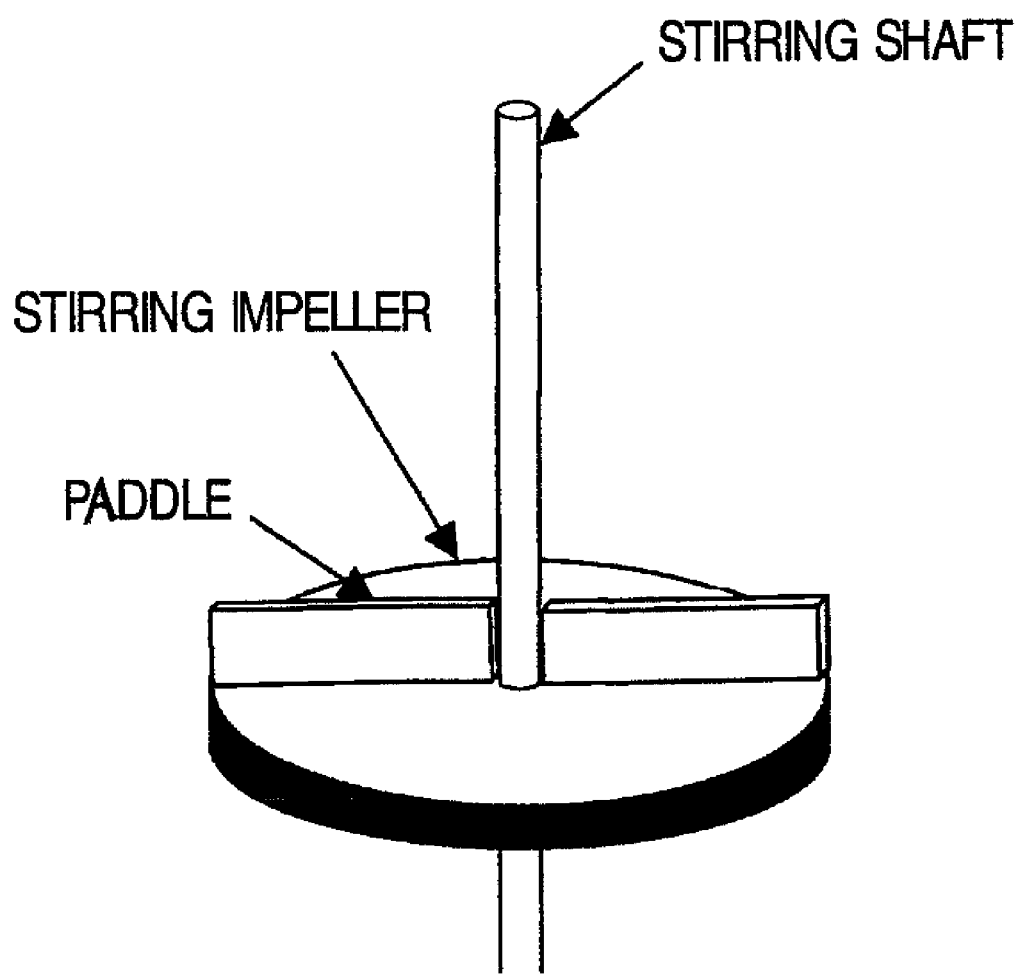

PROCESS FOR PRODUCTION OF AMPHOTERIC ELECTROLYTE RESIN BY CONTINUOUS BULK POLYMERIZATION AND APPARATUS FOR THE PRODUCTION

This is a divisional application of U.S. application Ser. No. 11/887,186 filed Sep. 26, 2007, now U.S. Pat. No. 7,879,957, which is a 371 of PCT/JP2005/005743 filed Mar. 28, 2005.

TECHNICAL FIELD

The present invention relates to a process for producing a synthetic polymer component used in industrial fields which paint, ink and the like pertain to.

More specifically, the present invention relates to a process for producing a synthetic polymer component used as a binder resin for a pigment or the like, an emulsifier for producing the resin, a dispersant for the pigment or the like, or an additive agent such as a solubilizing agent, a compatibilizer or the like by a continuous bulk polymerization method.

BACKGROUND ART

In the technical field as mentioned above, which the present invention pertains to, excellent techniques have been developed and put in practical use by efforts of predecessors, of which the main examples are as follows.

First, Patent Document 1 has provided a continuous bulk polymerization method for obtaining a synthetic polymer component composed of styrene or derivatives thereof, and (meta)acrylic acid, (meta)acrylic acid alkyl or the other (meta)acrylic derivative, and having a low molecular weight and a sharp molecular weight distribution, by employing thermal polymerization. The method has been put in practical use.

Also, Patent Document 2 has provided a continuous bulk polymerization method for obtaining a styrene-(meta)acrylic synthetic polymer component having a low molecular weight and a sharp molecular weight distribution, although it doesn't employ thermal polymerization. The method has been put in practical use.

Furthermore, Patent Document 3 has provided a continuous bulk polymerization method for obtaining a (meta)acrylic synthetic polymer component having a low molecular weight and a sharp molecular weight distribution, although it doesn't employ thermal polymerization. The method has been put in practical use.

In addition, a continuous bulk polymerization method for a monoalkenyl derivative has been also provided (Patent Document 4). The method has been put in practical use.

Furthermore, a continuous bulk polymerization method for a copolymer mainly derived from MMA has been also provided (Patent Document 5). The method has been put in practical use.

Also, a method for producing a polystyrene having a low molecular weight by employing the combination of a vessel type of polymerization device or a pipe type of polymerization device with an extruder has been also provided (Patent Document 6).

Furthermore, a motionless mixer in which a heat carrier can pass in the last half of a reaction, and a polymerizing method using the same have been also provided (Patent Document 7).

However, these continuous bulk polymerization methods do not teach a specific process for a copolymer as intended by the present invention which contains a radically polymerizable basic monomer and a radically polymerizable acidic monomer having a carboxyl group as essential components, i.e., a continuous bulk polymerization process for an amphoteric electrolyte resin.

The utility of copolymers which contain a radically polymerizable basic monomer and a radically polymerizable acidic monomer having a carboxyl group as essential components, i.e., the utility of amphoteric electrolyte resins have been demonstrated in Patent Documents 8 and 9. Also, these Documents describe a process for producing a synthetic polymer component composed of an amphoteric electrolyte resin by a bulk polymerization method. However, these documents do not describe a process for producing a synthetic polymer components composed of an amphoteric electrolyte resin by a continuous bulk polymerization method. The bulk polymerization method for an amphoteric electrolyte resin described in these Documents in fact has a disadvantage that the production costs are high.

Patent Document 1: JP-B-02-33041
Patent Document 2: JP-B-05-61284
Patent Document 3: JP-B-05-58005
Patent Document 4: U.S. Pat. No. 3,859,268
Patent Document 5: U.S. Pat. No. 3,968,059
Patent Document 6: JP-A-2002-37804
Patent Document 7: JP-A-09-31108
Patent Document 8: JP-B-1,344,622
Patent Document 9: JP-B-1,396,151

DISCLOSURE OF THE INVENTION

It is an object of the present invention to establish a continuous bulk polymerization process for producing an amphoteric electrolyte resin, in which the resin can be continuously polymerized and produced at low cost.

The continuous bulk polymerization method is characterized by the steps of: continuously feeding a mixture of multicomponent monomers having certain different reaction properties to a reaction vessel at a constant rate in a composition designed depending on the reaction properties; reacting the mixture up to a certain reaction yield in the vessel; taking out a reactant at the same rate; separating the remaining unreacted monomers from obtained polymers; totally analyzing the composition of the unreacted monomer mixture; compensating the gap with the designed composition, which correspond to the amount consumed of each of the monomers; and thereby continuously supplying a monomer mixture with the designed composition to continuously polymerize the mixture.

In order to perform a continuous bulk polymerization according to the above method, required are a device for separating the obtained polymer from the residual unreacted monomer mixture; a device for real-timely and totally analyzing the composition of the residual unreacted monomer mixture; and a device for real-timely regulating the composition of a supplied monomer mixture.

Thus, if an apparatus designed according to the requirements is used, a copolymer having a uniform composition distribution together with a uniform molecular weight distribution can be manufactured, because a monomer composition to be supplied can be controlled depending on the reaction properties of a polymerization system even when producing a copolymer in the system having extremely different copolymerizing reaction properties.

However, considering the apparatus cost, the method is unsuitable for producing a wide variety of copolymers in small amounts, although it is suitable for producing copolymers with a predetermined composition distribution and molecular weight distribution, in other words, it is suitable for producing a single item mass-producible copolymer.

When producing a wide variety of copolymers having a polar group, neither an emulsion polymerization nor suspension polymerization methods are employed because of a large restriction on composition. In such a case, a solution polymerization method in a batch style is usually employed. Then, in the method, a manufacturing process as mentioned below is generally performed. Firstly, monomers are polymerized by batch/dropping polymerization processes. In the polymerization processes, the composition of monomers charged into a furnace in advance and the concentration of an initiator charged into the furnace in advance, and the composition of the monomers dropped over polymerization time and the amount of the initiator dropped over the time have been successfully changed in view of the copolymerizing reaction properties of the system. Then, a solvent is removed.

However, this method requires high cost in including the process for removing the solvent. Also, the batch/dropping polymerization process is complicated, although it can result in copolymers having a uniform composition distribution and molecular weight distribution. Therefore, for the purpose of avoiding the complexity, a process for polymerizing only a composition of monomers and an initiator charged in advance without additionally dropping them has been performed. The process ordinarily requires optimizing the combination and composition of monomers charged in order to allow the composition distribution of obtained copolymers to be within the tolerance level.

In view of the technical matters, the present invention aims at providing a process for manufacturing various amphoteric electrolyte resins (copolymer) in a small lot with functional monomers having different polarities, which can result in the amphoteric electrolyte resins having a desired molecular weight and monomer unit composition ratio at low cost; and an apparatus therefor.

A basic technical conception to solve the above problems is as follows.

<1> Taking precise control into much consideration, apparatuses for a batch production with a small size are connected to each other in a multi-stage form to form a small-amount producing apparatus.

<2> The production of a wide variety of resins is developed by installing more apparatuses arranged in parallel.

<3> It is made possible to omit a device for separating a residual unreacted monomer mixture and a device for real-timely regulating the composition of a supplied monomer mixture by completing a continuous bulk polymerization at a high polymerization reaction yield in a line-sequential reaction apparatus. Also, it is made possible to achieve the molecular weight distribution (Mw/Mn is 1.5 to 10) comparable to that by usual bulk polymerizations and the polymerization reaction yield of 0.85 or more, only in one passage.

<4> In order to make the composition distribution of multicomponent copolymers prepared by continuous bulk polymerization methods as narrow as possible, the copolymerizing reaction properties of monomers to be used are taken into consideration to successfully select a monomer composition so that copolymers having a uniform composition can be obtained even in a discontinuous bulk polymerization.

Then, in order to solve the above problem, the present inventor pays attention to the following two matters.

(1) The molecular weight depends on the rate of polymerization reaction, and the reaction rate depends on temperature and the concentrations of monomers and an initiator to be reacted with. Therefore, how to control temperature, the concentrations of monomers and an initiator to be reacted with to time axis until they complete passing through reaction zone and the reaction is completed?

(2) The viscosity of fluid to be subjected to polymerization and pressure on it predominantly influence the rate of fluid passing through reaction zone, and the viscosity of the fluid is defined by the molecular weights and concentration of obtained copolymers and temperature. Therefore, how to control the temperature of the reaction zone and the feeding way of the fluid associated with the polymerization in order to constantly hold the rate of the fluid passing through the reaction chamber from a supply port to an outlet port?

The present invention has been made as a result of several attempts on the above matters.

The present invention relates to a process for producing an amphoteric electrolyte resin by continuous bulk polymerization, which comprises the steps of:

feeding, from a mixture supply port, a monomer mixture containing 0.01 to 10% by weight of at least one radically polymerizable basic monomer having a nitrogen atom, 0.01 to 35% by weight of at least one radically polymerizable acidic monomer having a carboxyl group and 45 to 99.98% by weight of a monomer capable of copolymerizing with the basic and acidic monomers, or a mixture of the monomer mixture with a polymerization initiator and/or an organic solvent having a boiling point of 80° C. or higher contained in an amount of 10% by weight or less to the total weight of the monomers, into a reaction zone composed of four polymerization zones which independently provide the mixture temperatures of the following $T_1$, $T_2$, $T_3$ and $T_4$:

$T_1$=50 to 160° C., $T_2$=70 to 190° C., $T_3$=70 to 250° C., $T_4$=70 to 270° C., and $T_1 < T_2$, $T_2 \leq T_3$ and $T_3 \leq T_4$; and continuously passing the mixture through the reaction zone with stirring while the residence time in each of the polymerization zones is controlled to 5 to 20 minutes; whereby a copolymer is produced in the reaction yield of 85% or higher in one passage through the reaction zone, and the amphoteric electrolyte resin has a number average molecular weight of 700 to 6,000 and a Mw/Mn ratio of 1.5 to 10.

Also, in a further aspect, the present invention relates to a continuous polymerization apparatus capable of being employed for the method as mentioned above. The continuous polymerization apparatus comprises:

a monomer mixture preparation vessel equipped with a heating/cooling device and a temperature controlling device for a reflux flow condenser;

a fluid feeding apparatus including a pump for moving a monomer mixture from the preparation vessel into a reaction zone and a regulator capable of ON/OFF-controlling the operation of the pump;

a reaction zone including at least four cylindrical polymerization zones connected to each other in series via flanges by washer-shaped partition plates, each of the partition plates having an opening with a diameter of 40 to 80 mm at a center thereof, and each of the polymerization zones having a thermosensor, a jacket for heating and an inner coil for cooling, independently controlling a temperature therein and having an inner diameter of 100 to 150 mmφ and an inner height of 120 to 250 mm;

a stirrer including a stirring shaft penetrating through the central axis of the reaction zone and at least one stirring impellers composed of a disk attached to the stirring shaft so as for the shaft to be located as a center of the disk and a paddle attached thereon, the stirrer being stirred at 50 to 700 rpm, and one or more of the stirring impeller being attached in an optional direction in the polymerization zones;

an extraction apparatus attached to the lowest polymerization zone, including a valve and valve automatically opening regulator which have a mechanism to enable it to be opened and closed in synchronization with the fluid feeding rate of the fluid feeding apparatus; and a fluid level regulator attached to the first polymerization zone, composed of a fluid level sensor and a regulator and regulating a fluid volume of monomers injected into the reaction zone to constantly hold a fluid level.

BRIEF DESCRIPTION OF THE DRAWINGS

FIG. 1 shows a section in the center of a reaction zone.

FIG. 2 is an enlarged view of a stirring impeller which a continuous polymerization apparatus of the present invention has.

BEST MODE FOR CARRYING OUT THE INVENTION

Figure 1:
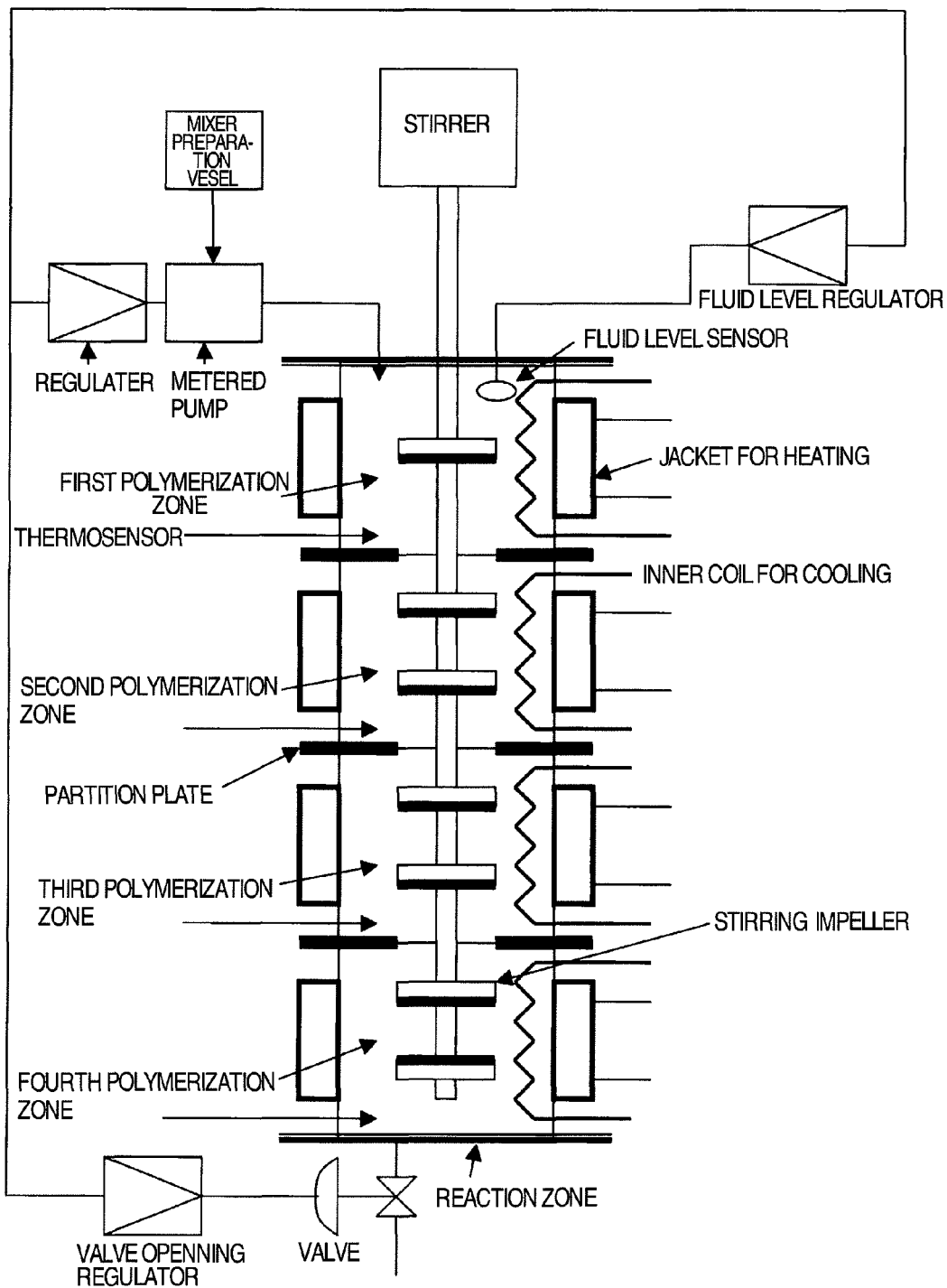
FIG. 1 is a schematic block diagram showing an aspect of a continuous polymerization apparatus of the present invention.

Hereinafter, the present invention will be described in detail.

In the present invention, examples of radically polymerizable basic monomers including a nitrogen atom include acrylates such as dimethylaminomethyl acrylate, diethylaminomethyl acrylate, dibutylaminomethyl acrylate, dihexylaminomethyl acrylate, dimethylaminoethyl acrylate, diethylaminoethyl acrylate, di(t-butyl)aminoethyl acrylate, diisohexylaminoethyl acrylate, dihexylaminopropyl acrylate and di(t-butyl)aminohexyl acrylate and methacrylates corresponding thereto. These may be used independently or in combination.

In the present invention, examples of radically polymerizable acidic monomers having a carboxyl group include acrylates such as 2-acryloyl oxyethyl succinate and 2-acryloyl oxyethyl phthalate as well as α,β-ethylenic unsaturated carboxylic acid such as acrylic acid, methacrylic acid, itaconic acid and maleic acid, and methacrylates corresponding thereto. These may be used independently or in combination.

In the present invention, examples of monomers capable of copolymerizing with the monomers as mentioned above include a hydroxyalkyl ester of an acrylic acid or methacrylic acid, for example, monomers such as 2-hydroxyethyl acrylate, 2-hydroxyethyl methacrylate, hydroxypropyl acrylate and hydroxypropyl methacrylate. These may be used independently or in combination.

Examples of straight-chain or branched-chain (meth)acrylate monomers having 1 to 18 carbon atoms include monomers such as alkyl ester or cycloalkyl ester of acrylic acid or methacrylic acid, for example, methyl acrylate, methyl methacrylate, ethyl acrylate, ethyl methacrylate, n-butyl acrylate, n-butyl methacrylate, i-butyl acrylate, i-butyl methacrylate, t-butyl acrylate, t-butyl methacrylate, cyclohexyl acrylate, cyclohexyl methacrylate, 2-ethylhexyl acrylate, 2-ethylhexyl methacrylate, lauryl acrylate and lauryl methacrylate. These may be used independently or in combination.

Furthermore, examples of polymerizable monomers which are a styrene derivative include monomers such as styrene and α-methyl styrene. These may be used independently or in combination.

In addition, as other monomers capable of copolymerizing with the monomers as mentioned above, a vinyl monomer such as an acryl amide or a methacryl amide, for example, acryl amide, methacryl amide, N-methyl acryl amide, vinyl toluene, vinyl acetate, acrylonitrile and methacrylonitrile may be used independently or in combination.

Although the monomers as mentioned above may be optionally combined in the present invention, the combination is preferably selected so that an instant composition of each copolymer at a polymerization reaction rate keeps as flat as in the range of the polymerization reaction rate of 0.5 to 0.95.

For this end, a Q-e value which predominantly influences a radical reactivity of each of the monomers and a molar fraction of each of fed monomers are typically employed. Then, in accordance with a Q-e scheme of Alfrey-Price, a monomer-composition ratio is sequentially calculated from a molar fraction indication of each of monomer units of a copolymer formed from various monomers in an eye blink to semiempirically simulate the transition of instantaneous copolymer compositions, whereby the fed composition may be selected so that the change as mentioned above gets flat. These selections may be executed by employing a personal computer through a trial and error process.

However, even if an instant composition of each copolymer at a polymerization reaction rate does not continue to be flat in the range of the polymerization reaction rate of 0.5 to 0.95, the combination can be considered to be adopted to a used object as long as the composition distribution does not show a blend system of a copolymer clearly like, for example, an acrylic-vinyl acetate copolymer.

In the present invention, an azo polymerization initiator such as azobisisobutyronitrile and a peroxide polymerization initiator such as benzoyl peroxide can be used independently or in combination. The amount to be used may be determined so as to obtain copolymers having a targeted molecular weight distribution by some trials on the selected combination of the temperatures and the residence times in at least four polymerization reaction zones, as mentioned below. However, it is preferable that the azo initiator is used independently or in combination in order to avoid the formation of branched copolymers.

In the method of the present invention, a chain transfer agent can be also optionally used. For example, mercaptans such as n-lauryl mercaptan, tertiarydodecyl mercaptan and 2-mercaptoethanol, and styrene derivatives such as Nofiner MSD can be used. 2 mercaptoethanol or Nofiner MSD having small molecular weight is preferable in good results.

The polymerization initiator may not be necessarily used. A system in which a polymerization reaction proceeds without any initiator by raising the temperature may contain no initiator.

The criterion for judgment is as follows:

(a) The radical polymerization reaction tends to proceed in an acid system. Therefore, the initiator can be preferably used when using a large amount of nitrogen-containing monomer which easily makes the system to be shifted to an alkali side. When using an initiator, as a result, the polymerization reaction temperature will be lowered.

(b) When a monomer, solvent or chain transfer agent which are not the polymerization initiator but has an initiating function exists, no initiator should be used; the initiator should be used lowering polymerization temperature; or the amount of an initiator to be used should be adjusted depending on polymerization temperatures to be set. Examples of such a compound having an initiating function include an oxyethylene group-containing monomer and a hydroxyl group-containing compound.

(c) When an acid or basic polar group, particularly, the basic group exists in small amount, a three-dimensional, reaction such as cross-linking between molecules hardly occurs, or styrene easily thermal-polymerized exists in large amount, the polymerization initiator does not have to be used: in other words, so-called thermal polymerization can be employed.

Thus, it may be determined according to these criterions whether the polymerization initiator is used. If no initiator is used, it results in high temperature polymerization.

The solvents capable of being used in the present invention depend on the temperature and pressure during reaction in each of the polymerization zones. The solvents preferably have a large solubility to the monomer to be used but do not boil at the temperature in the polymerization zones under pressure. Particularly, an alcohol and a ketone, since they have a good solubility to an amino group-containing polymerization compound, are preferable.

The amount of a solvent to be used is preferably 10% by weight or less to the total amount of monomers.

However, aromatic compounds such as toluene and xylene; ketones such as acetone, methyl ethyl ketone and methyl isobutyl ketone; alcohols such as n-butanol, isobutanol and isopropyl alcohol; esters such as ethyl acetate and n-butyl acetate; and ether or ester derivatives of polyhydric alcohol such as diethylene glycol monoethyl ether or the like can be employed. These may be used independently or in combination.

Although these solvents may not be essentially used, the use of the solvents often makes a process stabilized. Therefore, the solvents may be used if needed.

Next, an apparatus capable of being used for the process of the present invention will be described. An example of the apparatuses according to the present invention is shown in FIG. 1.

In the meantime, a polymerization process according to a bulk polymerization method is as follows.

In the initial stage of the polymerization, the concentration of monomers is high, and the polymerization reaction rate is high. Since the concentration of the formed copolymer is still low at this stage, the viscosity of the system is comparatively low.

As the polymerization reaction proceeds, the monomers are consumed, the concentration of the residual monomers becomes lower, and the polymerization reaction rate gradually slows down. On the other hand, the concentration of the formed copolymer becomes higher, and thus the viscosity of the system increases.

The molecular weight of the formed copolymer depends on the polymerization reaction rate. Therefore, it is necessary to hold the polymerization reaction rate continuously in order to obtain a copolymer having a narrow molecular weight distribution. In a polymerization process according to the above bulk polymerization method, for this end, as the polymerization reaction proceeds, it is necessary to raise a polymerization temperature to a suitable one. As a result, the polymerization temperature is controlled over time so as to obtain a constant polymerization reaction rate.

In view of this point, the present invention performs a polymerization reaction by continuously moving a mixture subjected to polymerization at a certain temperature into a different environment at a higher temperature. It should be obvious that it is preferable to increase the number of the transitions to other temperature environments as much as possible in order to perform this process ideally. However, the present inventors have found out that a substantially constant polymerization reaction rate is obtained by the transitions of at least four times. Thus, this discovery results in a continuous bulk polymerization method by four polymerization zones.

Also, although the viscosity of the system is increased as the polymerization reaction proceeds, the level of the viscosity is varied depending on the molecular weights (distribution) of the copolymers in the system. Even if the environment at high temperature is provided, it is most difficult to hold a constant viscosity until the completion of the polymerization.

Therefore, typically, the movement to the four polymerization zones which have different temperature environments would be performed by employing separate fluid feeding pumps and separate vessels with polymerization zones of different sizes designed in view of each of the residence times. However, the apparatus of the present invention may not have such structures.

The apparatus of the present invention comprises:

a monomer mixture preparation vessel equipped with a heating/cooling device and a temperature controlling device for a reflux flow condenser;

a fluid feeding device including a metering pump for feeding a monomer mixture from the preparation vessel into a reaction zone and a regulator capable of ON/OFF-controlling the operation of the pump;

a reaction zone including at least four cylindrical polimerization zones continuously and vertically connected with each other via flanges by washer-shaped partition plates, each of the partition plates having an opening with a diameter of 40 to 80 mm at a center thereof, each of the polymerization zones having an inner diameter of 100 to 150 mm$\phi$ and an inner height of 120 to 250 mm, having a thermosensor, a jacket for heating and an inner coil for cooling, and capable of independently controlling temperatures therein, the mixture temperatures of $T_1°$ C., $T_2°$ C., $T_3°$ C. and $T_4°$ C. in the first, second, third and fourth polymerization zones from the top being capable of being respectively controlled so as to satisfy the following expressions: $T_1$=50 to 160° C., $T_2$=70 to 190° C., $T_3$=70 to 250° C., $T_4$=70 to 270° C., and $T_1 < T_2$, $T_2 \leq T_3$ and $T_3 \leq T_4$;

a stirrer including at least one or more stirring impeller (see FIG. 2) composed of a disk of 40 to 100 mm$\phi$ and a paddle impeller attached onto the disk and consisting of two parts which constitute a diameter of the disk, the stirring impeller being attached in an optional direction in each of the zones to a stirring shaft penetrating through the reaction zone, and the stirrer being capable being stirred at 50 to 700 rpm;

an extraction device attached to the lowest polymerization zone, and including a valve and automatically valve opening regulator which have a mechanism to enable the valve to open and close in synchronization with a fluid feeding rate of the fluid feeding device; and a fluid level regulator attached to the first polymerization zone, and composed of a fluid level sensor and a regulator, the fluid level sensor regulating a fluid volume of monomers fed into the reaction zone to constantly hold a fluid level.

The continuous polymerization apparatus can feed a reactant under pressure of 0.05 MPa to 5 MPa from a supply pump at the upper part, regulate residence time of a mixture (including polymerization products as the reaction proceeds) in each of the zones within 5 to 20 minutes, and take out the reactant from the fourth zone, whereby a continuous bulk polymerization method for an amphoteric electrolyte resin according to the present invention is performed to produce a copolymer in a reaction yield of 85% or more through one fluid passage.

First, referring to a reaction vessel, it has been built up by connecting cylindrical polymerization zones with the same size within a minimized diameter of 100 to 150 mm$\phi$ and a length of 120 to 250 mm with each other by simple partition plates. As a result, a middle pumps are omitted, and all the fluid movement is performed by the supply pump at the first polymerization zone.

Referring to a temperature condition, if the first, second, third and fourth polymerization zones from the top provide the mixture temperatures of $T_1°$ C., $T_2°$ C., $T_3°$ C. and $T_4°$ C., respectively, $T_1$, $T_2$, $T_3$ and $T_4$ are respectively controlled so as to satisfy the following expressions: $T_1$=50 to 160° C., $T_2$=70 to 190° C., $T_3$=70 to 250° C., $T_4$=70 to 270° C., and $T_1<T_2$, $T_2 \leq T_3$ and $T_3 \leq T_4$. More preferably, in the existence of an initiator, the mixture temperatures of $T_1$, $T_2$, $T_3$ and $T_4$ in four polymerization zones satisfy the following expressions: $T_1$=50 to 100° C., $T_2$=70 to 120° C., $T_3$=70 to 150° C., $T_4$=70 to 180° C., $T_1<T_2$, $T_2 \leq T_3$ and $T_3 \leq T_4$.

Also, in the absence of any initiator, preferably, the mixture temperatures of $T_1$, $T_2$, $T_3$ and $T_4$ in four polymerization zones satisfy the following expressions: $T_1$=100 to 160° C., $T_2$=100 to 200° C., $T_3$=100 to 240° C., $T_4$=100 to 270° C., $T_1<T_2$, $T_2 \leq T_3$ and $T_3 \leq T_4$.

If the polymerization scale is enlarged, it is preferable to provide the apparatuses in parallel.

In the apparatus of the present invention, in order to smoothly move fluid having different viscosities in the reaction zone, the cylinders of the polymerization zones may be vertically connected with each other, a stirring shaft penetrating through the reaction zone be provided, and stirring impellers be attached to the shaft in a different form in each of the polymerization zones.

A diameter D2 of a stirring impeller may be designed to be set to a rate of 0.3 to 0.8 to a cylindrical inner diameter D1 of a reaction zone, preferably a rate of 0.35 to 0.6. According to one preferable example, the arrangement of a stirring impeller is as follows (see FIG. 1).

The first polymerization zone: one stirring impeller in which a paddle impeller is attached onto the upper surface of a disk.

The second polymerization zone: the same stirring impellers are set at the upper and lower positions.

The third polymerization zone: the same as above.

The fourth polymerization zone: a stirring impeller is set at the upper position, and another is set at the lower position with paddle side face downward.

The rotational speed of the shaft may be 50 to 700 rpm. The rotational speed is preferably 200 to 400 rpm, but it may be suitably selected depending on the viscosity of the system.

The fluid feeding rate may be generally 0.2 to 2 kg/min, and preferably 0.3 to 0.82 kg/min.

This may be optionally selected depending on the properties of the system.

The pressure of the pump may be adjusted to satisfy this condition. The pressure is preferably 0.05 MPa to 0.5 MPa.

EXAMPLES

Hereinafter, the present invention will be described in further details with working examples.

Example 1

Preparation of Monomer Mixture

Materials to be used were previously stirred and mixed in a vessel made of SUS. The composition is as follows.

TABLE 1

| | |
|---|---|
| stylene | 43.17% by weight |
| butyl acrylate | 18.58% by weight |
| acrylic acid | 26.54% by weight |
| diethylaminoethyl metacrylate | 4.42% by weight |

TABLE 1-continued

| | |
|---|---|
| 2-mercaptoethanol | 6.63% by weight |
| 2,2'-azobis(2,4-dimethylvaleronitrile) | 0.40% by weight |
| 1,1'-azobis(cyclohexane-1-carbonitrile) | 0.09% by weight |

Preparation of Reactor

A single pipe made of stainless steel which have the size of 130 mmϕ×150 mm H and a thickness of 5 mm and flanges at both ends, a jacket having an electric heater for heating outside of the single pipe, and a thermosensor and an inner coil for cooling-inside of the single pipe are employed to constitute a polymerization zone. When each of the flanges was connected, a disk made of stainless steel and having an opening with 65 mmϕ at the center and a thickness of 2 mm was used as a partition plate, and four polymerization zones were vertically connected with each other to form a reaction vessel having the first, second, third and fourth polymerization zones from the top.

A material inlet port, a stirring shaft, a stirrer and a pressure gauge were provided at the top flange of the first polymerization zone. An outlet port for taking out the reactant was formed at a bottom flange of the fourth polymerization zone, and each of the polymerization zones could be automatically and independently controlled over the inner temperature.

For stirring in each of the polymerization zones, the following is provided: a stainless steel shaft with 12 mmϕ penetrating through each of the polymerization zones, and seven stirring impellers in which two paddle impellers having a height of 14 mm were attached onto a disk of 50 mmϕ having a thickness of 2 mm without sticking out of the perimeter of the disk. These stirring impellers were respectively located in each of the polymerization zones as follows:

The first polymerization zone: A stirring impeller was located at the middle position and its paddle impeller has upward face.

The second polymerization zone: Two stirring impellers were located so that the zone was divided into three and their paddle impellers have upward faces.

The third polymerization zone: The same as the above.

The fourth polymerization zone: Two stirring impellers were located so that the zone was divided into three. The paddle impeller at the upper position has upward face, but the paddle impeller at the lower position has downward face.

Thus, the contents is hardly mixed between the polymerization zones due to the existence of plate parts, and the contents is sufficiently mixed up in the polymerization zones due to the existence of the paddle parts to result in a desirable state where the flow from the top to the bottom is close to laminar flow rather than turbulent flow.

Polymerization Procedure:

First, while closing the outlet port, a monomer mixture as method above was charged in the fourth polymerization zone at room temperature and the temperature was raised so as to be set to 80° C. in 10 minutes.

After 10 minutes, another monomer mixture was charged into the third polymerization zone at room temperature and the temperature was raised so as to be set to 80° C. in 10 minutes. Meanwhile, the temperature in the fourth polymerization zone was adjusted so as to be held at 80° C.

After 20 minutes in total, another monomer mixture was charged into the second polymerization zone at room temperature, and the temperature was raised so as to be set to 80° C. in 10 minutes. Meanwhile, the temperature in the third polymerization zone was held at 80° C. Simultaneously, the temperature in the fourth polymerization zone was raised to 100° C. in 2 to 3 minutes, and was held at 100° C.

After 30 minutes in total, another monomer mixture was charged into the first polymerization zone at room temperature, and the temperature was raised so as to be set to 80° C. in 10 minutes. Meanwhile, the temperature of the second polymerization zone was held at 80° C. Simultaneously, the temperature of the third polymerization zone was raised to 100° C. in 2 to 3 minutes, and was held at 100° C. The fourth polymerization zone was promptly raised from 100° C. to 120° C., and was held at 120° C.

According to the procedure as mentioned above, after 30 to 40 minutes in total, the following temperature pattern could be formed in the polymerization zones:

The first polymerization zone: raising of from room temperature to 80° C.;
The second polymerization zone: holding of the temperature at 80° C.;
The third polymerization zone: raising of from 80° C. to 100° C. and holding the temperature at 100° C.; and
The fourth polymerization zone: raising of from 100° C. to 120° C. and holding the temperature at 120° C.

After 40 minutes in total, the outlet port was opened. Then, a new monomer mixture was charged into the first polymerization zone at room temperature while continuously taking out the reactant from the fourth polymerization zone. The amount to be charged was adjusted so that total residence time during the whole process was set to 40 minutes, and the temperature was controlled so that the temperature conditions in the polymerization zones showed the pattern as mentioned above. The reactant was then taken out at a constant speed.

The above process was continued, it was confirmed that the process reached to the stationary state, and then the reactant was taken out to be characterised.

The resin obtained thus had the following characteristics:

TABLE 2

| polymerization reaction yield | 94.1% |
|---|---|
| number average molecular weight Mn: | 1,589 |
| weight average molecular weight Mw: | 14,623 |
| dispersion degree Mw/Mn: | 9.2 |

This resin was completely dissolved at concentration of 50% in a mixed solvent of 7/3 of xylene/isopropyl alcohol, and completely and transparently dissolved at a concentration of 30% in aqueous ammonia water.

Example 2

A monomer mixture having the following composition was prepared.

TABLE 3

| Compounds | % by weight |
|---|---|
| styrene | 42.41 |
| butyl acrylate | 18.17 |
| acrylic acid | 12.98 |
| methacrylic acid | 12.98 |
| diethylaminoethyl methacrylate | 4.33 |
| 2-mercaptoethanol | 4.33 |
| isopropyl alcohol | 4.33 |
| 2,2'-azobis(2,4-dimethylvaleronitrile) | 0.39 |
| 1,1'-azobis(cyclohexane-1-carbonitrile) | 0.09 |

The same apparatus and operation as those used in Example 1 were used to polymerize the mixture.

The obtained resin had the following characteristics:
polymerization reaction yield: 89.3%
number average molecular weight Mn: 1,940
weight average molecular weight Mw: 16,783
dispersion degree Mw/Mn: 8.6

This resin was transparently dissolved at a concentration of 50% in a mixed solvent of xylene/ethyl acetate/isopropyl alcohol: 4/4/2, and completely and transparently dissolved at a concentration of 30% in aqueous ammonia.

Example 3

A monomer mixture having the following composition was prepared.

TABLE 4

| Compounds | % by weight |
|---|---|
| styrene | 27.88 |
| butyl acrylate | 27.88 |
| acrylic acid | 23.89 |
| diethylaminoethyl methacrylate | 3.98 |
| 2-mercaptoethanol | 7.96 |
| isopropyl alcohol | 7.96 |
| 2,2'-azobis(2,4-dimethylvaleronitrile) | 0.36 |
| 1,1'-azobis(cyclohexane-1-carbonitrile) | 0.08 |

The same apparatus and operation as those used in Example 1 were used to polymerize the mixture.

The obtained resin had the following characteristics:

TABLE 5

| polymerization reaction yield: | 97.1% |
|---|---|
| number average molecular weight Mn: | 1,068 |
| weight average molecular weight Mw: | 4,505 |
| dispersion degree Mw/Mn: | 4.2 |

The resin was dissolved at a concentration of 50% in a mixed solvent of xylene/isopropyl alcohol: 7/3, and completely dissolved at a concentration of 30% in a monoethanolamine aqueous solution.

Example 4

A monomer mixture having the following composition was prepared:

TABLE 6

| Compounds | % by weight |
|---|---|
| styrene | 27.90 |
| ethyl acrylate | 27.90 |
| acrylic acid | 23.91 |
| diethylaminoethyl methacrylate | 3.99 |
| 2-mercaptoethanol | 7.97 |
| isopropyl alcohol | 7.97 |
| 2,2'-azobis(2,4-dimethylvaleronitrile) | 0.36 |

The same apparatus as that used in Example 1 was used. The mixture was polymerized in the same manner as that in Example 1 except that the residence time of each of the polymerization zones was changed from 10 minutes to 15 minutes and the mixture temperature of each of the polymerization zones other than the first polymerization zone was set to 80° C. Therefore, all the reaction time becomes 60 minutes.

The resin obtained thus had the following characteristics:

polymerization reaction rate: 96.2%
number average molecular weight Mn: 1,091
weight average molecular weight Mw: 3,983
dispersion degree MW/Mn: 3.7

This was dissolved at a concentration of 50% in a mixed solvent of toluene/ethyl acetate/ethanol: 4/4/2 and transparently dissolved at a concentration of 30% in aqueous ammonia.

Example 5

A monomer mixture having the following composition was prepared:

TABLE 7

| Compounds | % by weight |
|---|---|
| methyl methacrylate | 27.93 |
| butyl acrylate | 27.93 |
| acrylic acid | 23.94 |
| diethylaminoethyl methacrylate | 3.99 |
| 2-mercaptoethanol | 7.98 |
| isopropyl alcohol | 7.98 |
| 2,2'-azobis(2,4-dimethylvaleronitrile) | 0.29 |

The same apparatus as that of Example 1 and the same operation as that of Example 4 were used to polymerize the mixture.

The resin obtained thus had the following characteristics:

TABLE 8

| polymerization reaction yield: | 97.5% |
|---|---|
| number average molecular weight Mn: | 1,303 |
| weight average molecular weight Mw: | 2,135 |
| dispersion degree Mw/Mn: | 1.6 |

The resin was dissolved at a concentration of 50% in a mixed solvent of xylene/isopropyl alcohol: 8/2, and completely dissolved at a concentration of 30% in a morpholine aqueous solution.

Example 6

A monomer mixture having the following composition was prepared:

TABLE 9

| Compounds | % by weight |
|---|---|
| Styrene | 13.97 |
| methyl methacrylate | 13.97 |
| butyl acrylate | 27.93 |
| acrylic acid | 23.94 |
| diethylaminoethyl methacrylate | 3.99 |
| 2-mercaptoethanol | 7.98 |
| isopropyl alcohol | 7.98 |
| 2,2'-azobis(2,4-dimethylvaleronitrile) | 0.24 |

The apparatus of Example 1 and the operation of Example 4 were used to polymerize the above monomers. As a result, a resin having the following characteristics was obtained:
polymerization reaction yield: 98.5%
number average molecular weight Mn: 1,187
weight average molecular weight Mw: 3,619
dispersion degree Mw/Mn: 3.0

This was dissolved at a concentration of 50% in a mixed solvent of xylene/ethanol:8/2, and transparently dissolved at a concentration of 30% in ammonia water.

Example 7

A monomer mixture having the following composition was prepared, and was held at room temperature.

TABLE 10

| Compounds | % by weight |
|---|---|
| 2-hydroxyethyl methacrylate | 9.20 |
| 2-ethylhexyl methacrylate | 5.03 |
| diethylaminoethyl methacrylate | 44.43 |
| methacrylic acid | 6.07 |
| Styrene | 4.16 |
| methyl methacrylate | 17.70 |
| 2-mercaptoethanol | 4.34 |
| isopropyl alcohol | 8.68 |
| 2,2'-azobis(2,4-dimethylvaleronitrile) | 0.39 |

The same apparatus as that of Example 1 was used. The mixture was polymerized in the same manner as in Example 4 except that the residence time of each of the zones was changed from 10 minutes to 11 minutes and the temperature of each of the polymerization zones other than the first polymerization zone was set to 80° C. Therefore, all the reaction time becomes 46 minutes.

The resin obtained thus had the following characteristics:

Table 11

| polymerization reaction rate: | 95.4% |
|---|---|
| number average molecular weight Mn: | 1,756 |
| weight average molecular weight Mw: | 3,007 |
| dispersion degree Mw/Mn: | 1.7 |

This resin was completely dissolved at a concentration of 50% in a mixed solvent of xylene/ethanol:7/3, and dissolved at a concentration of 30% in aqueous ammonia.

Example 8

A monomer mixture having the following composition was prepared, and was held at room temperature.

TABLE 12

| Compounds | % by weight |
|---|---|
| 2-hydroxyethyl methacrylate | 19.92 |
| 2-ethylhexyl methacrylate | 10.91 |
| diethylaminoethyl methacrylate | 27.53 |
| methacrylic acid | 4.68 |
| styrene | 4.50 |
| methyl methacrylate | 19.05 |
| 2-mercaptoethanol | 4.34 |
| isopropyl alcohol | 8.68 |
| 2,2'-azobis(2,4-dimethylvaleronitrile) | 0.39 |

The same apparatus as that of Example 1 and the same operation as that of Example 7 were used to polymerize the above monomer mixture.

TABLE 13

| polymerization reaction rate: | 93.7% |
|---|---|
| number average molecular weight Mn: | 2,146 |
| weight average molecular weight Mw: | 3,797 |
| dispersion degree Mw/Mn: | 1.8 |

As a result, the resin was completely dissolved at a concentration of 50% in a mixed solvent of xylene/ethanol:7/3, and dissolved at a concentration of 30% in aqueous ammonia.

Example 9

A monomer mixture having the following composition was prepared, and was held at 80 to 100° C.

TABLE 14

| Compounds | % by weight |
| --- | --- |
| styrene | 44.15 |
| butyl acrylate | 18.92 |
| acrylic acid | 27.02 |
| dimethylaminoethyl methacrylate | 0.10 |
| Nofmer MSD | 9.81 |

The same apparatus as that of Example 1 and the same operation as that of Example 1 were used to polymerize the above monomer mixture except that the temperatures of the first zone, second zone, third zone and fourth zone were respectively 150° C., 180° C., 230° C. and 250° C.; and the residence time of each of the zones was set to 8 minutes.

The obtained resin had the following characteristics:
polymerization reaction yield: 96.6%
number average molecular weight Mn: 1,431
weight average molecular weight Mw: 6,113
dispersion degree Mw/Mn: 4.3

The resin was completely dissolved in a mixed solvent of xylene/ethanol:7/3, and transparently dissolved at a concentration of 30% in aqueous ammonia.

Example 10

A monomer mixture having the following composition was prepared, and was held at 80 to 100° C.

TABLE 15

| Compounds | % by weight |
| --- | --- |
| styrene | 17.32 |
| methyl methacrylate | 17.32 |
| butyl acrylate | 34.64 |
| acrylic acid | 27.66 |
| dimethylaminoethylmethacrylate | 0.10 |
| 2-mercaptoethanol | 2.97 |

The same apparatus as that of Example 1 was used, and the temperature and operation of each of the zones were used and performed according to Example 9; to polymerize the above monomer mixture.

The obtained resin had the following characteristics:

TABLE 16

| polymerization reaction yield: | 96.4% |
| --- | --- |
| number average molecular weight Mn: | 1,591 |
| weight average molecular weight Mw: | 5,025 |
| dispersion degree Mw/Mn: | 3.2 |

This resin was completely dissolved in a mixed solvent of xylene/ethanol:7/3, and transparently dissolved at a concentration of 30% in aqueous ammonia.

Comparative Example 1

The same monomer composition as that of Example 1, and an apparatus having the conventional paddle type impeller instead of all the stirring impellers of the apparatus used in Example 1 was used to polymerize the monomer composition according to Example 1. The monomer moved at a blast through the shaft to a lower exit. The polymerization did not proceed.

Comparative Example 2

Instead of all the stirring impellers in used Comparative Example 1, conventional plate type impellers were used to perform the polymerization. However, the reaction temperature was raised like a runaway reaction, and the reaction temperature could not be controlled to fail the polymerization.

INDUSTRIAL APPLICABILITY

Functional substances such as pigments used in industrial fields which paint, ink and the like pertain to cannot exhibit the function independently. They essentially exhibit the function only after they are dispersed in the binder resin as a medium.

Therefore, functional substances such as pigments having various acidic and basic chemical characteristics on the surface inevitably required various chemical properties for binder resins for the substances, i.e. synthetic polymer components.

For the requirements, synthetic polymer components used in the fields ordinarily contain a binder resin as main components as well as a dispersant in conformity with the acidic and basic chemical properties on the surface of each of the functional substances, an emulsifier for the resin, or an additive agent such as a solubilizing agent or compatibilizer for mediating the resin and the dispersant. Thus, the synthetic polymer components used in the fields are essentially products with diverse functions, and they are produced in small lots.

It has been understood that so-called amphoteric electrolyte resins having both acidic and basic functions are useful as the above synthetic polymer components. However, there has been no means for producing amphoteric electrolyte resins having low molecular weights and a narrow molecular weight distributions at low cost.

The present invention overcomes this problem, and thus has a large contribution in the fields.

The invention claimed is:

1. A continuous polymerization apparatus comprising:
a reaction vessel being substantially cylindrical, having a first end plate flange with a monomer mixture inlet port there through and a second end plate flange at the distal end of the reaction vessel, with a polymer outlet port there through, said first end plate further having a hole, substantially circular, located at a center axis of the cylindrical reaction vessel to pass through a stirring shaft along the axis of the reaction vessel, wherein the reaction vessel includes,
at least four polymerization zones adjacent to each other in series, there being a first and a last polymerization zone, along the axis of and inside the reaction vessel, each polymerization zone being separated by a partition plate, each partition plate having an opening located at the center axis of the reaction vessel thereof to pass through the stirring shaft,
each of the polymerization zones having a thermosensor for sensing temperature within the polymerization zone, a heating device for heating the polymerization zone and a cooling device for cooling the polymerization zone, and
a stirrer including a rotatable stirring shaft along the axis of the reaction vessel extending to be in each polymerization zone, and at least one stirring impeller attached to the stirring shaft which is located within each polymerization zone.

2. The continuous polymerization apparatus of claim 1, wherein:
the heating device includes a heating jacket circumferentially surrounding the outside of the reaction vessel corresponding to the polymerization zone within; and
the cooling device includes a cooling coil inside the reaction vessel.

3. The continuous polymerization apparatus of claim 1, wherein the thermosensor, and at least one of the heating device and cooling device in each of the polymerization zones, independently control a mixture temperature in each of the polymerization zones so that the mixture temperature in a polymerization zone is higher than the temperature in a preceding polymerization zone through which the mixture passed.

4. The continuous polymerization apparatus of claim 3, wherein the reaction vessel includes four polymerization zones, and the mixture temperatures therein, $T_1$, $T_2$, $T_3$ and $T_4$, satisfy the following expressions:

$$T_1=50 \text{ to } 160° \text{ C.}, T_2=70 \text{ to } 190° \text{ C.}, T_3=70 \text{ to } 250° \text{ C.}, T_4=70 \text{ to } 270° \text{ C., and } T_1<T_2, T_2<T_3 \text{ and } T_3<T_4.$$

5. The continuous polymerization apparatus of claim 1, wherein said stirring impeller includes,
an disk shaped plate, having a center and two flat surfaces, which is attached to the stirring shaft wherein the shaft is located at the center of the disk, and
a paddle affixed to and protruding from a surface of the disk.

6. The continuous polymerization apparatus of claim 1, wherein a ratio, D2/D1, of a diameter D2 of the stirring impeller to a cylindrical inner diameter D1 of the reaction vessel is 0.3 to 0.8.

7. The continuous polymerization apparatus of claim 5, wherein the stirring impeller is positioned in any direction in each of the polymerization zones.

8. The continuous polymerization apparatus of claim 7, wherein the reaction vessel is vertically oriented, includes four polymerization zones, and the stirring impellers are positioned within the zones as follows:
1) within the first polymerization zone, one stirring impeller has one paddle protruding from the upper surface of the impeller disk;
2) within the second polymerization zone, there are two stirring impellers wherein each stirring impeller has one paddle protruding from the upper surface of the impeller disk;
3) within the third polymerization zone, there are two stirring impellers wherein each stirring impeller has one paddle protruding from the upper surface of the impeller disk; and
4) within the fourth polymerization zone, there are two stirring impellers wherein one stirring impeller has one paddle protruding from the upper surface of the impeller disk and the second impeller has one paddle protruding from the lower surface of the impeller disk.

9. The continuous polymerization apparatus of claim 1, wherein each of the partition plates has an opening with a diameter of 40 to 80 mm at a center thereof, and each of the polymerization zones has an inner diameter of 100 to 150 mm and an inner height along the axis of 120 to 250 mm.

10. The continuous polymerization apparatus of claim 1, further comprising a fluid feeding apparatus including a pump for moving a monomer mixture at a fluid feed rate.

11. The continuous polymerization apparatus of claim 10, wherein said pump consists of a pump for moving the monomer mixture from the monomer mixture preparation vessel into the first polymerization zone.

12. The continuous polymerization apparatus of claim 11, wherein the reaction vessel is oriented vertically.

13. The continuous polymerization apparatus of claim 11, wherein the pump applies pressure so that residence time of a mixture in each of the zones is regulated within 5 to 20 minutes.

14. The continuous polymerization apparatus of claim 1, wherein each portion of the reaction vessel containing a polymerization zone is connected with each other in series via flanges.

15. The continuous polymerization apparatus of claim 1, further including a monomer mixture preparation vessel equipped with a heating/cooling device and a temperature controlling device.

16. The continuous polymerization apparatus of claim 1, wherein the opening at the center of each partition plate is substantially round.

17. The continuous polymerization apparatus of claim 10, further including an extraction apparatus, having an extraction valve and an extraction valve regulator for moving a polymer product from the last reaction zone through the polymer outlet port of the reaction vessel.

18. The continuous polymerization apparatus of claim 17, further including a control mechanism to operate the extraction valve regulator to open and close in synchronization with the fluid feed rate of the fluid feeding apparatus.

19. The continuous polymerization apparatus of claim 10, further including a fluid level regulator, having a fluid level sensor located within the first polymerization zone, the fluid level regulator controlling the fluid feed rate of the fluid feeding apparatus.

* * * * *